US012400020B2

(12) United States Patent
Lewis et al.

(10) Patent No.: US 12,400,020 B2
(45) Date of Patent: Aug. 26, 2025

(54) ARCHITECTURES AND SYSTEMS FOR MANAGING PERSONAL DATA TO BE UTILIZED BY DYNAMIC SETS OF EXTERNAL PARTIES

(71) Applicant: Uniscen, Boise, ID (US)

(72) Inventors: Quinn Stevens Lewis, Spring, TX (US); Richard Dean Jarvis, II, Boise, ID (US)

(73) Assignee: Uniscen, Boise, ID (US)

( * ) Notice: Subject to any disclaimer, the term of this patent is extended or adjusted under 35 U.S.C. 154(b) by 0 days.

(21) Appl. No.: 17/531,583

(22) Filed: Nov. 19, 2021

(65) Prior Publication Data
US 2022/0114279 A1    Apr. 14, 2022

Related U.S. Application Data

(63) Continuation of application No. 15/937,746, filed on Mar. 27, 2018, now Pat. No. 11,182,497.

(60) Provisional application No. 62/477,680, filed on Mar. 28, 2017.

(51) Int. Cl.
G06F 21/62    (2013.01)
G06F 21/31    (2013.01)

(52) U.S. Cl.
CPC .......... *G06F 21/6245* (2013.01); *G06F 21/31* (2013.01)

(58) Field of Classification Search
CPC .............................. G06F 21/6245; G06F 21/31
See application file for complete search history.

(56) References Cited

U.S. PATENT DOCUMENTS 9,992,022 B1\* 6/2018 Chapman .............. H04L 9/3236
2007/0061170 A1 3/2007 Lorsch
2008/0147859 A1\* 6/2008 Fujita .................. H04L 67/1097
709/225
2009/0326982 A1 12/2009 Deobhakta et al.
(Continued)

FOREIGN PATENT DOCUMENTS

CA           2629017 A1    6/2009
WO      2016168922 A1    10/2016
WO      WO2018183351       3/2018

OTHER PUBLICATIONS

Final Office Action for U.S. Appl. No. 15/937,746 mailed Jul. 15, 2020, 16 pages.
(Continued)

Primary Examiner — Sangseok Park
(74) Attorney, Agent, or Firm — Jaffery Watson Hamilton & DeSanctis LLP

(57) ABSTRACT

Techniques and architectures to manage personal data. Permissions are maintained information for one or more portions of the electronic personal record. Connection information for the one or more portions of the electronic personal record are maintained. At least one of the one or more portions of the electronic personal record information from a static document provided by the user and dynamic information obtained via an integration with an external data source. The one or more processors further to evaluate claims on portions of the electronic record from providers utilizing attribute-based security mechanisms. The corresponding portions of the electronic personal record are selectively provided in response to results of the evaluation.

21 Claims, 9 Drawing Sheets

(56) References Cited

U.S. PATENT DOCUMENTS

| | | |
|---|---|---|
| 2013/0254699 A1 | 9/2013 | Bashir et al. |
| 2016/0314458 A1 | 10/2016 | Douglas et al. |
| 2018/0191722 A1* | 7/2018 | Barnes .................... H04L 63/10 |
| 2019/0207946 A1* | 7/2019 | Mertens .............. G06F 21/6245 |

OTHER PUBLICATIONS

Final Office Action for U.S. Appl. No. 15/937,746 mailed Jun. 21, 2021, 17 pages.
International Preliminary Report on Patentability for International Application No. PCT/US18/24599 mailed Oct. 10, 2019, 7 pages.
International Search Report and Written Opinion for International Application No. PCT/US18/24599 mailed May 24, 2018, 8 pages.
Non-Final Office Action for U.S. Appl. No. 15/937,746 mailed Dec. 18, 2019, 13 pages.
Non-Final Office Action for U.S. Appl. No. 15/937,746 mailed Feb. 22, 2021, 16 pages.
Notice of Allowance for U.S. Appl. No. 15/937,746 mailed Sep. 22, 2021, 11 pages.
Ramachandran, et al., "Using Blockchain and Smart Contracts for Secure Data Provenance Management", arXiv:1709.10000v1 [cs.CR], https://arxiv.org/pdf/1709.10000.pdf, Sep. 28, 2017, 11 pages.
Sundareswaran, et al., "Promoting Distributed Accountability in the Cloud", 2011 IEEE 4th International Conference on Cloud Computing, 8 pages.

* cited by examiner

PERMISSION MATRIX 500

| | Accountant | Banker | Financial Advisor | Consultant | Attorney | Employees |
|---|---|---|---|---|---|---|
| Contact Information | X | X | X | X | X | X |
| Business Objectives | X | X | X | X | X | X |
| Financial Statements | X | X | X | X | | |
| P&L | X | X | | X | | |
| Balance Sheet | X | X | | X | | |
| Credit/Debit | X | X | X | | | |
| Savings & Investments | X | X | X | X | X | |
| Insurance | X | X | X | | | |
| Retirement | X | X | X | | | |
| Loans | X | X | X | X | X | |
| Mortgages | X | X | | | X | |
| Future Expenses | X | X | | X | X | |
| Salary | X | X | | | | |
| Pay Stubs | X | X | | | | |
| Bank Statements | X | X | X | | | |
| Wills & Trusts | X | | | | X | |
| Tax Returns | X | X | | | | |

FIG. 5

ARCHITECTURES AND SYSTEMS FOR MANAGING PERSONAL DATA TO BE UTILIZED BY DYNAMIC SETS OF EXTERNAL PARTIES

CLAIM FOR PRIORITY

This application is a continuation of and claims priority to U.S. patent application Ser. No. 15/937,746, filed on Mar. 28, 2018, titled "Architectures and Systems for Managing Personal Data to be Utilized By Dynamic Sets of External Parties," now U.S. Pat. No. 11,182,497, with an issue date of Nov. 23, 2021, which claims priority to U.S. Provisional Patent Application No. 62/477,680, filed on Mar. 28, 2017, titled "Architectures and Systems for Managing Crowd-sourced Data to be Analyzed by Disparate Entities," both of which are incorporated by reference in their entirety.

TECHNICAL FIELD

Embodiments relate to techniques for managing personal information within environments to share with multiple external parties. More particularly, embodiments relate to techniques and architectures that allow for more accurately monitoring and flagging service disruptions within a multi-server environment utilizing a single database node.

BACKGROUND

Most people have some form of electronic information that is stored and either maintained as private or shared with one or more providers, for example, banks, insurance agents, family members, etc. Managing this information with the desired level of accessibility, privacy and security can be a complex problem.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 5 is an example permission matrix that can be utilized to manage one or more electronic personal records.

DETAILED DESCRIPTION

Figure 1:
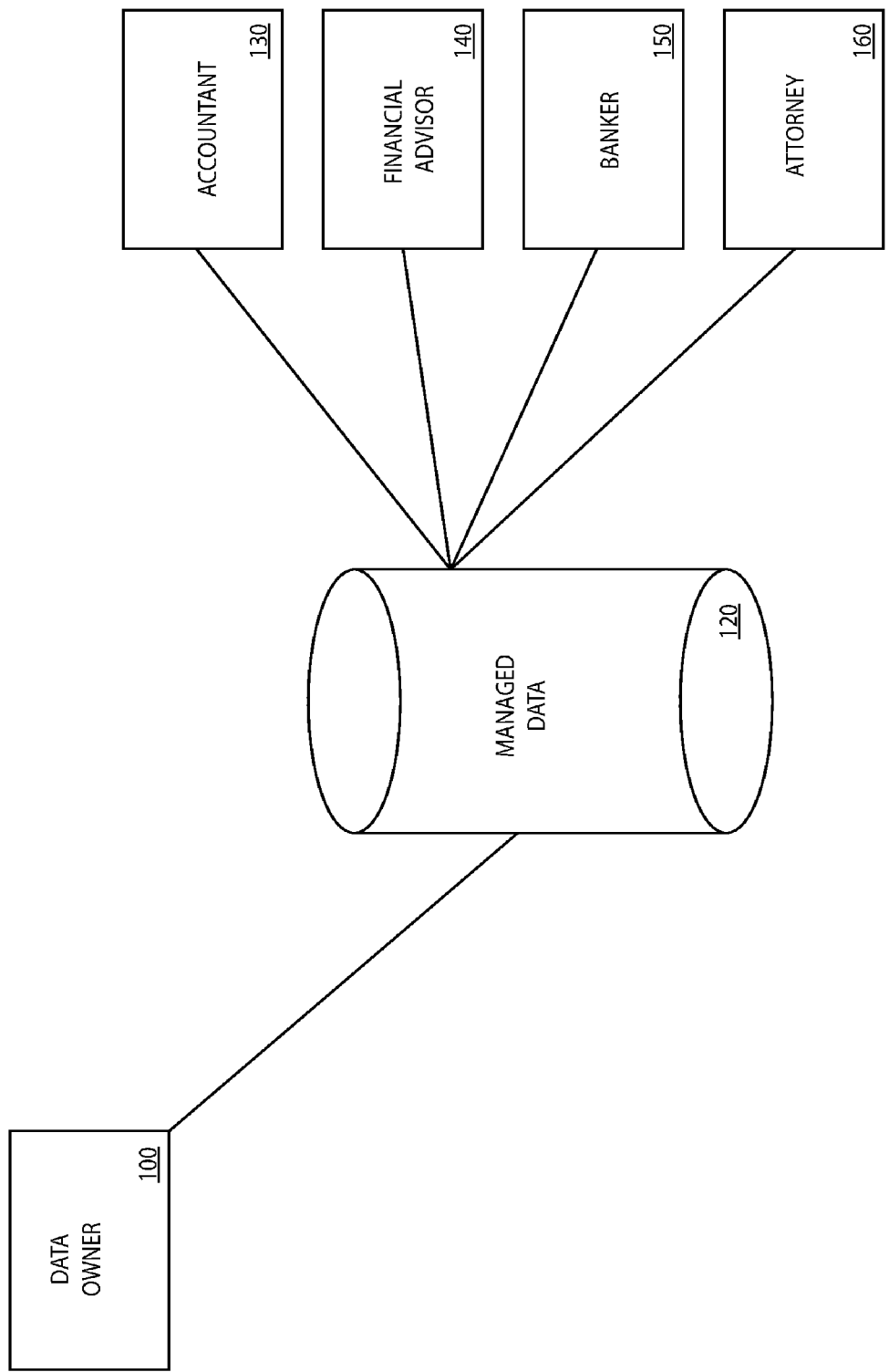
FIG. 1 is a block diagram of one example of the current data silo problem.

In the following description, numerous specific details are set forth. However, embodiments of the invention may be practiced without these specific details. In other instances, well-known structures and techniques have not been shown in detail in order not to obscure the understanding of this description.

Described herein are various architectures and techniques to allow data owners (consumers) to control personal information (e.g., financial information, government issued identifiers, licenses, certifications, personal records, medical information) in an environment through which the data owners can also selectively share the personal information with one or more providers (e.g., banker, insurance agent, doctor, financial advisor, spouse, investor) and deliver that data or information in the format needed by the provider to perform the services (e.g., autofill on a loan application, generate PDF documents).

Take Brian for an example. Brian is semi-retired with investments and business interests spread across multiple states and portfolios. Because he chooses not to share his entire portfolio with just one provider, the only way to get the big picture is to manage his own spreadsheets, which can take several hours to update each time. And the pain is all the more real because Brian has just had to step in and administer the estate of a loved one—and he has no idea if he has all their accounts and information—let alone if he can find all their passwords.

This illustrates a common problem. Brian loses control over his data and must reproduce information gathering efforts with each provider he works with because they all operate in their own data silos—which is the same data silo problem that has existed for decades. It could take Brian six months to two years to administer his family member's estate. He will have to acquire and wait for insurance policy statements, account information, business and legal documents, etc.

For the providers, the costs are just as significant. For example, it takes a banker between 10 and 30 business days to gather the necessary information to begin underwriting a commercial loan. These costs and complexities exist for all providers and are multiplied when multiple providers are involved with a transaction or deal.

Described herein are architectures and techniques that can allow a consumer/data owner to create an electronic personal record and then grant access to any provider of choice, sharing only the information they choose. In one embodiment, information is uploaded one time and can be maintained and shared with multiple providers. Personal, business, and financial information can be categorized and shared and/or maintained.

Instead of having to send reports, share integrations directly with providers, such as a CPA, Financial Advisor, or employee, the customer can track an entire portfolio in real time including real estate. Securely collaborate with multiple providers such as CPA, Bankers, and Attorneys—and get business done in real time. Share information based on user-defined roles such as a CPA, Financial Advisors, and even a spouse or employee. In one embodiment, the consumer can grant access to documents simultaneously across all selected roles and track usage and changes via blockchain audit trails. Integrations refers to pulling of data (e.g., bank account information, brokerage account information) from a source (e.g., bank web page, brokerage web page) to be used in the electronic personal record.

FIG. 1 is a block diagram of one example of the current data silo problem. Data owner 100 has some amount of managed data 120, which can include any type of data that can be maintained electronically, for example, using a database, a spreadsheet, various document files, etc. In order for data owner 100 to share any or all of managed data 120 with various providers, for example, accountant 130, financial advisor 140, banker 150 and/or attorney 160, data owner 100 must share specific files with the selected providers. This can be accomplished by, for example, sending an electronic mail message to the provider with an attached file. Other, more sophisticated, approaches exist, but those approaches still require user actions that can be time consuming and often overlooked.

Figure 2:
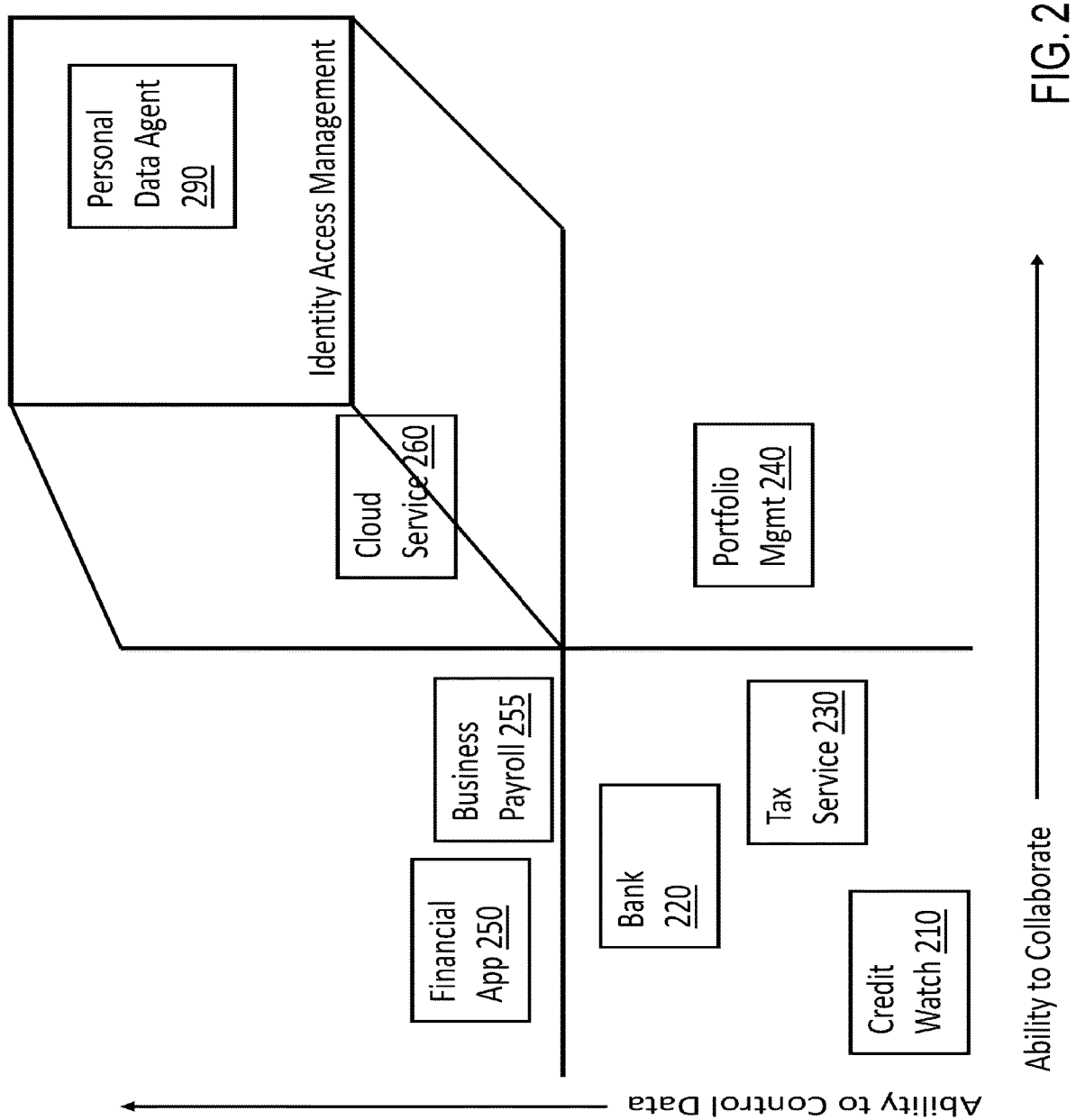
FIG. 2 is a quadrant layout of various data management tools in terms of ability to collaborate and ability to control the data.

FIG. 2 is a quadrant layout of various data management tools in terms of ability to collaborate and ability to control the data. Various data management solutions currently exist that provide different trade-offs and advantages in terms of the ability to control data (vertical axis) and the ability to collaborate (horizontal axis).

For example, credit watch service 210 provides information to the user, but little (or no) control over data and little (or no) ability to collaborate with others. Bank app/service 220 can provide both better control over data and ability to collaborate than credit watch service 210; however, both are still limited. Tax service 225 can provide improved ability to collaborate (e.g., with one or more tax professionals), but no improvement over control of data as compared to bank app/service 220.

Portfolio management app/service 240 provides an increased ability to collaborate with similar levels of data control. Financial app/service 230 and business payroll app/service provide increased ability to control data, but limited ability to collaborate. Cloud file service 250 provides increased collaboration and control of data as compared to the previous examples, but still suffers from the data silo problem discussed above.

Described in greater detail below are techniques and architectures to provide an additional dimension in terms of identity access management. In various embodiments, personal data agent 290 can provide a powerful and flexible platform and tool to manage data and access to the data while overcoming the data silo problem and providing a more efficient and effective platform for data control and management.

In various embodiments, personal data agent 290 can provide users/customers full control over their own information and data. In various embodiments, personal data agent 290 can allow users/customers to share information with anyone outside of their organization while maintaining access control. In various embodiments, personal data agent 290 can maintain audit trails. In various embodiments, personal data agent 290 can connect financial data and integrations with other information, for example, legal documents and/or contracts.

For example, a real estate investor can track his/her entire portfolio in one place including property values. The financial data of the individual properties can be connected with the respective legal documents and information. When the user/owner shares the property with a provider, both the financial data and the connected documents and information are made available to the provider. In various embodiments, multiple providers can be connected to the same project, for example, title companies, real estate agents, attorney, buyers, sellers, construction companies, city services. Document histories and/or audit trails can also be maintained.

The techniques and architectures described herein allow for adding a third dimension of security to the existing solutions. Instead of sharing individual files or folders, the platform provides identity access management where the user/consumer defines roles and permissions to their data, not just documents, but the integrations as well. This concept is illustrated in the top right corner where personal data agent 290 provides solutions beyond the existing technologies. Conceptually, the platform provides pipes between all the services customers use to help the consumer leverage their own data and get more value from business relationships.

Figure 3:
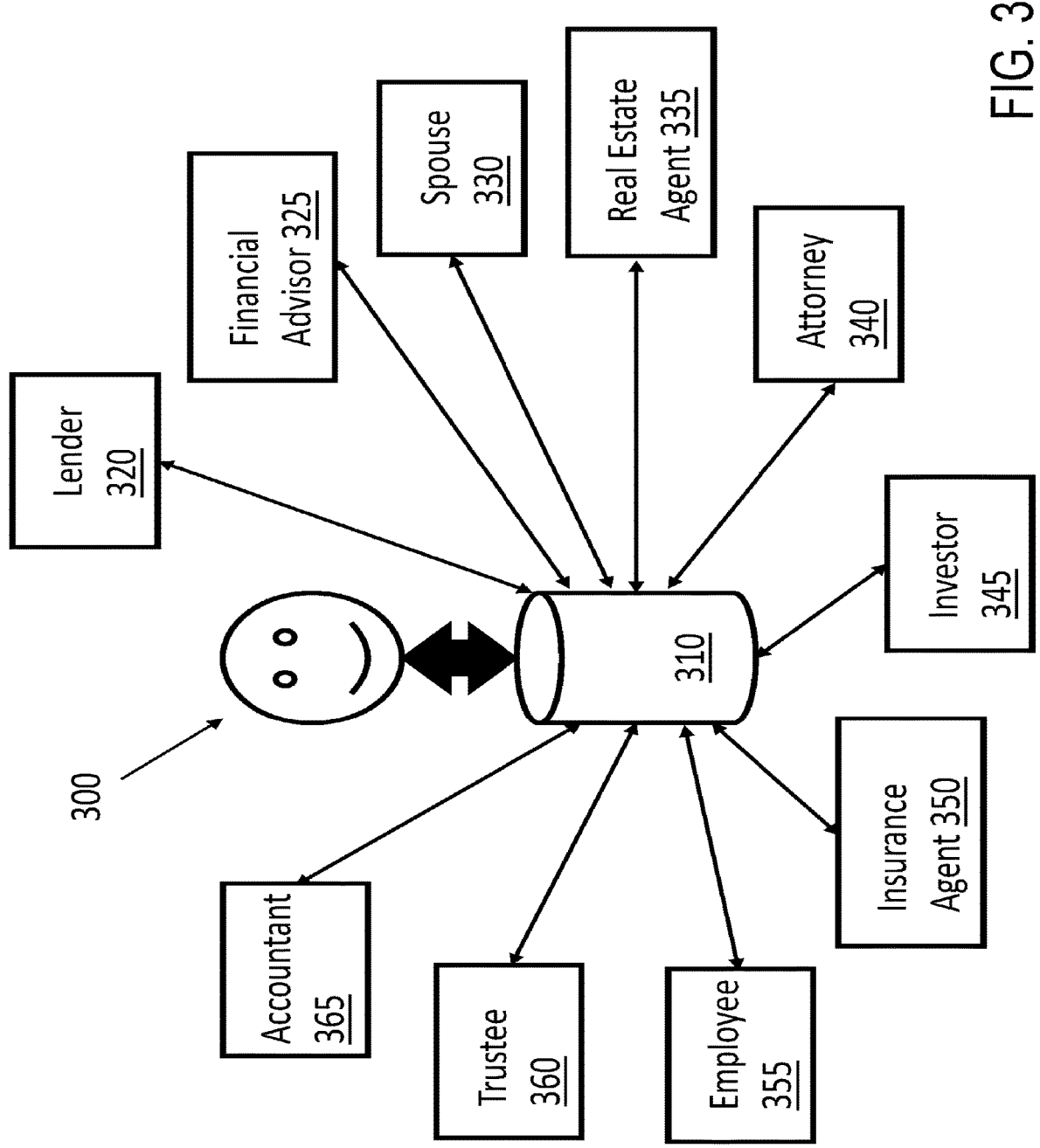
FIG. 3 is a conceptual illustration of a sharing architecture utilizing an electronic personal record.

FIG. 3 is a conceptual illustration of a sharing architecture utilizing an electronic personal record. As described in greater detail below, electronic personal record 310 generally represents the data owned by (or controlled by) owner 300. Owner 300 can be one or more parties that have some ownership of (or control over) data to be stored and shared. As described in greater detail below, identity access management and/or blockchain technologies can be utilized to provide the functionality described herein.

Conceptually, electronic personal record 310 can be considered a single record; however, the records/databases/storage devices/etc. utilized to provide electronic personal record 310 can be on a single computing device or distributed across multiple computing devices. In various embodiments, electronic personal record 310 can function to aggregate personal, business and/or financial information while connecting these with important documents. In various embodiments, the platform utilized to manage electronic personal record 310 can deliver a secure information sharing platform and give user 300 control over access permissions.

Thus, user 300 can be provided the ability to aggregate personal, business and financial data with supporting documents. Further, user 300 can be provided with full control over information access grants to any provider or connection of choice. This can allow user 300 to collaborate with many selected providers on one or more projects and can be provided with audit trails and communication histories for each transaction. Thus, the platform can provide the highest levels of data security along with high levels of collaboration flexibility.

The secure information sharing platform described herein allows providers, for example, lender 320, financial advisor 325, spouse 330, real estate agent 335, attorney 340, investor 345, insurance agent 350, employee 355, trustee 360, accountant 365, the ability to gather necessary information and deliver services to user 300 in a more efficient and effective manner than previously possible. This also provides the providers with the protection of not being responsible for managing any of the data belonging to user 300. The providers can also have access to audit trails and communication history with each transaction. Other and/or different providers can also be supported.

Thus, the providers can achieve several advantages over current data management and collaboration solutions. For example, providers can provide products and services more quickly because they can gather the required data and information in a more efficient manner. Time can be more efficiently allocated to higher-value services because data gathering burdens are reduced. Greater transparency can be provided and data management risks, for example, data breaches can be reduced.

Figure 4:
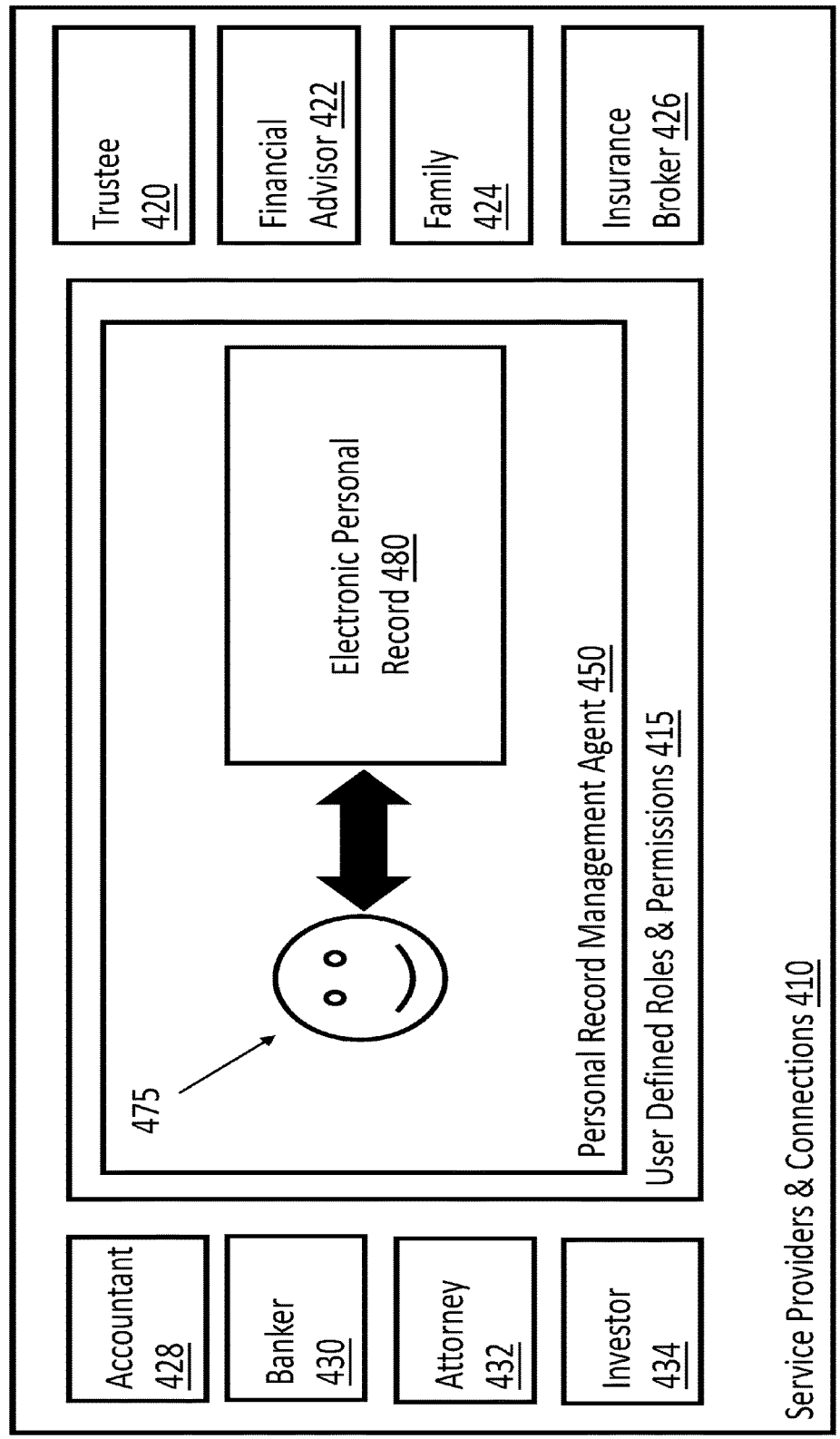
FIG. 4 is a block diagram of an information sharing platform that can provide the functionality described herein.

FIG. 4 is a block diagram of an information sharing platform that can provide the functionality described herein. In the example of FIG. 4, user 475 owns/controls electronic personal record 480 and can manage electronic personal record 480 utilizing personal record management agent 450.

In various embodiments, user 475 can create and/or manage user-defined roles and permissions (415) to allow one or more service providers to allow service providers to utilize one or more connections (410) to access one or more portions of electronic personal record 480. Service providers can include, for example, trustee 420, financial advisor 422, family member 424, insurance agent 426, accountant 428, banker 430, attorney 432 and investor 434. Other and/or different service providers can also be supported.

In various embodiments, the connections, roles and permissions (410, 415) can be managed and administered by user 475 via information sharing platform 400 to provide identity and access management with respect to electronic personal record 480. Attributes refer to characteristics of policies (e.g., who, when, where) that allow access to the data. For example, an accountant can have access to financial data for a two-month period. Claims are the entities (e.g., a specific bank) that are granted access to the data. Attributes correspond to roles and permissions 415 in FIG. 4, while claims correspond to connections 410 in FIG. 4.

In various embodiments, block chain technologies can be utilized to manage the claims and attributes corresponding to data in electronic personal record 480. Blockchain technologies are used, for example, to provide digital currency. Blockchain allows digital information to be distributed, not copied and continually reconciled. Thus, by managing claims and attributes with a blockchain (or similar) architecture high degrees of control, accountability and robustness can be provided.

In various embodiments, personal record management agent 450 can combine claims on the data in electronic personal record 480 with attributes on transactions involving the data in electronic personal record 480 to implement a method (or a key or a token) for authorizing and authenticating requests for the data from the providers.

FIG. 5 is an example permission matrix that can be utilized to manage one or more electronic personal records. Permission matrix 500 can be presented as a graphical user interface (GUI) or can be a conceptual mapping of information obtained and/or presented through a GUI.

Permission matrix 500 illustrates providers 520 (e.g., accountant, banker, financial advisor, consultant, attorney, employees) and corresponding data categories (e.g., contact information, business objectives, financial statements, profit and loss statements, balance sheet, credit/debit information, investments, insurance information, retirement account information, loans, mortgages, expenses, salaries, pay status, bank statements, wills and trusts, tax returns). Additional and/or different providers can be supported. Additional and/or different data categories can be supported.

Permission matrix 500 provides a mapping through which a user can select which providers have access to which types of information. The permissions can further include additional information (e.g. timing) that is not specifically illustrated in FIG. 5.

Figure 6:
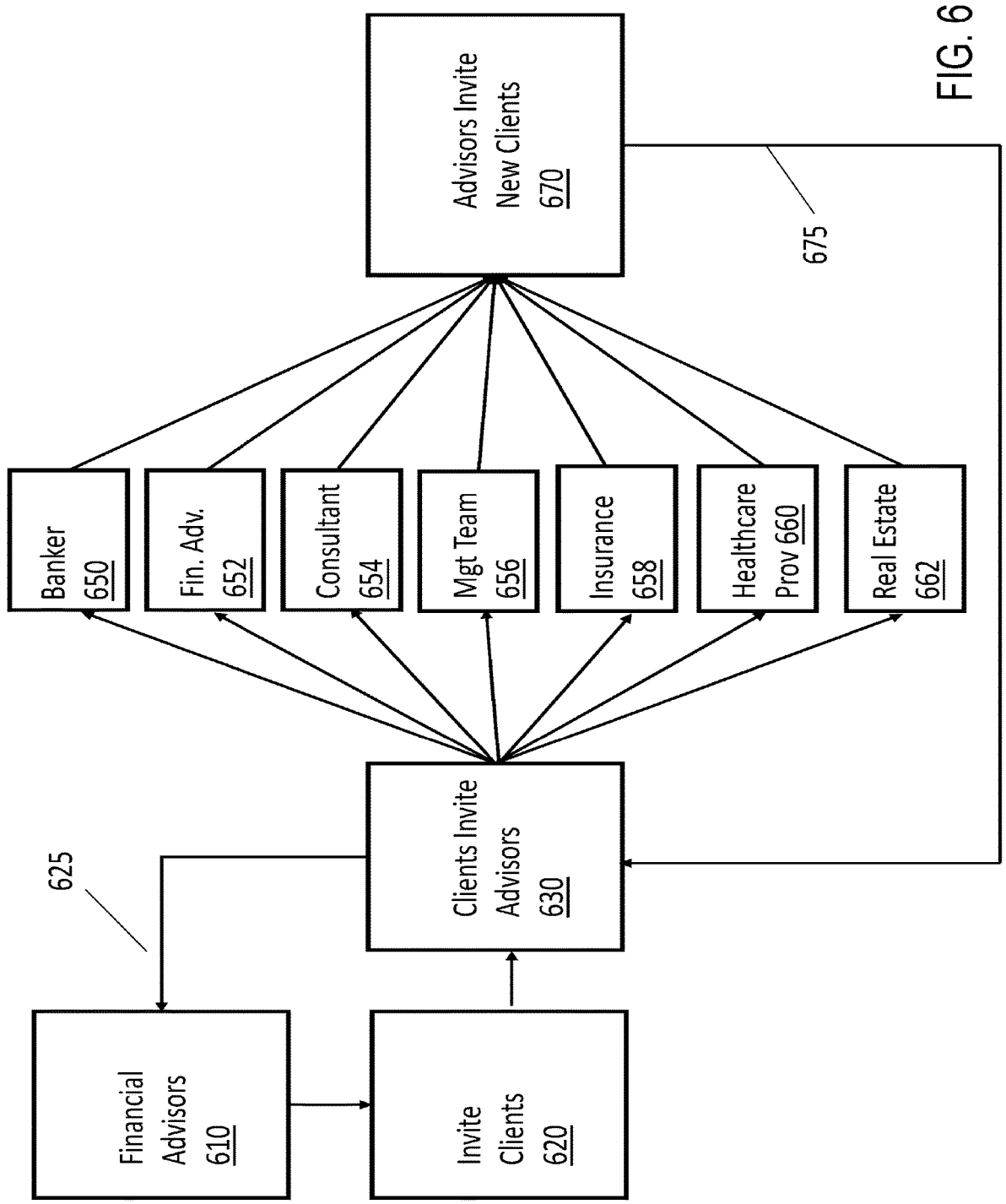
FIG. 6 illustrates a distribution model that may be utilized.

FIG. 6 illustrates a distribution model that may be utilized. The example of FIG. 6 is provided in terms of a financial advisor and clients of the financial advisor; however, the distribution technique can be applied to any type of provider. Additional and/or different types of providers/advisors can be supported.

In one embodiment, financial advisor 610 can have access to an information sharing platform (e.g., 400 in FIG. 4) and can invite clients to use the platform (620) to manage and share data according to the architectures and techniques described herein. Invited clients can invite advisors/providers (630), which can include the financial advisor (625). As illustrated in FIG. 6, the client can invite many types of advisors (e.g., banker 650, financial advisor 652, consultant 654, management team 656, insurance broker 658, healthcare provider 660, real estate agent 662). One or more of the advisors can also invite their clients to the platform (670), which can include clients already utilizing the platform (675).

Figure 7:
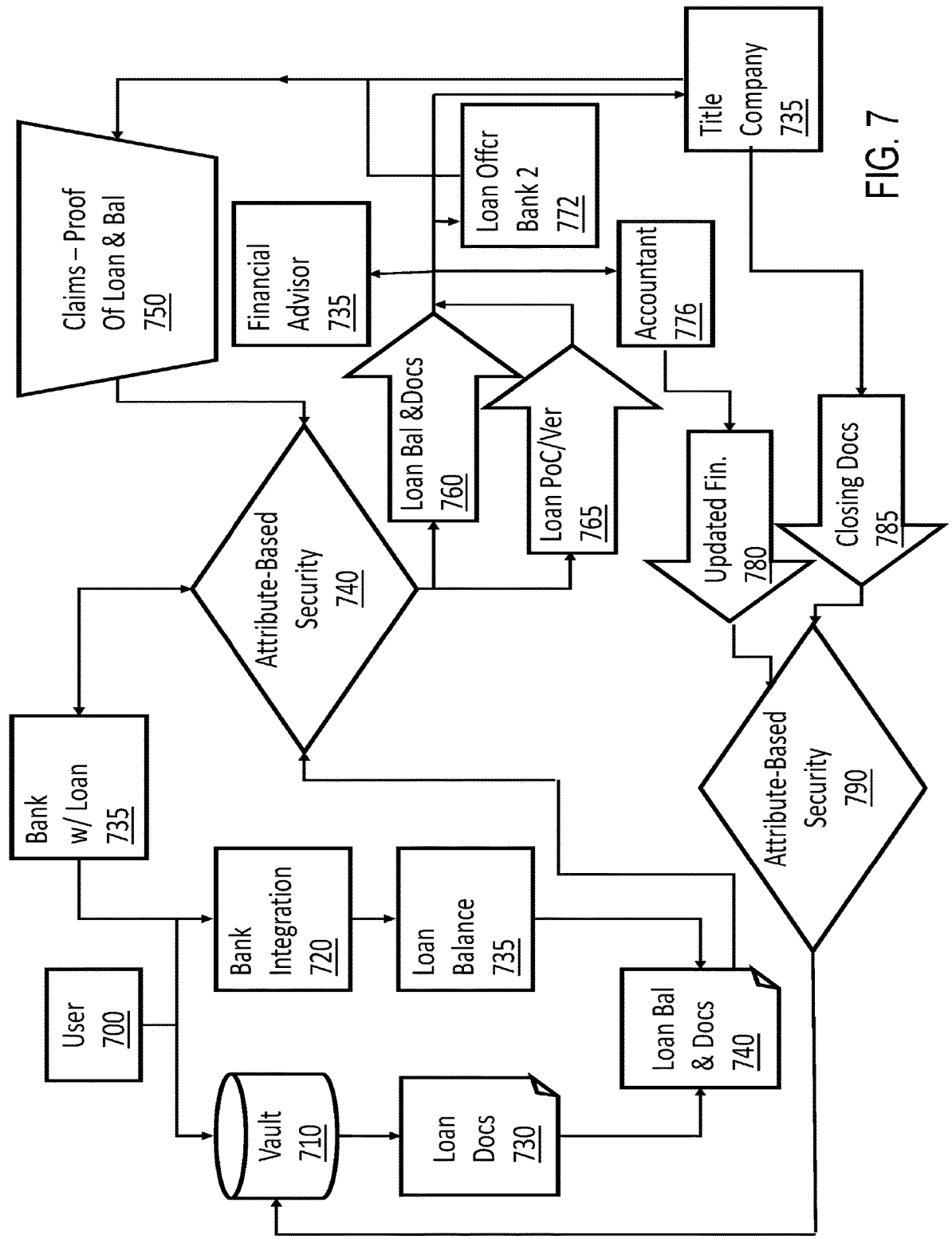
FIG. 7 is a flow diagram of an example data flow in which a user shares loan information.

FIG. 7 is a flow diagram of an example data flow in which a user shares loan information. The example of FIG. 7 is intended to be an example use case and is not intended to be limiting on the inventive concepts described herein.

In the example of FIG. 7, user 700 has control over some or all of the data stored in vault 710. This data can include, for example, an electronic personal record as described above. Additional and/or different information can also be stored in vault 710. Also, data from multiple users can be stored in vault 710. In one embodiment, vault 710 is controlled by user 700. In alternate embodiments, vault 710 can be part of an information sharing platform (e.g., 400 in FIG. 4).

In one embodiment, the data stored in vault 710 can include loan documents 715. Loan documents 715 can include, for example, a loan application, an appraisal, a profit and loss (P&L) statement, supporting financial documents.

In one embodiment, user 700 can configure or otherwise utilize bank integration 720 to electronic banking information. In this example, bank integration 720 can be utilized to acquire loan balance 725 (or loan history) from bank 735. Loan documents 715, loan balance 725 and/or other information can be utilized to provide loan balance and supporting documents 730.

Thus, the platform provides the ability to combine dynamic data from integrations (e.g., loan balance 725) with appropriate supporting documents (e.g., 730) into what electronic personal record 480 manages and securely shares according to permissions and connections as described above. The combining of structured and unstructured data in this way allows the owner to control access and permissions across any number of connections and providers.

In one embodiment, the platform utilizes attribute-based security 740 to deliver loan balance and supporting documents (760) and to deliver loan proof of claim/verification (765). Example providers to which delivery can occur include financial advisor 770, loan officer at a different bank 772, title company 774 and accountant 776. As one example of managing feedback from a provider, accountant 776 can provide updated financial documents and tax returns 780 to vault 710 utilizing attribute-based security 790. Similarly, title company 774 can provide closing documents to vault 710 using attribute-based security 790.

Bank 2 (not shown in FIG. 7) can then send integrated data such as the new loan balance 720 together making an updated 725. Combining loan documents 715 and loan balance 725 in combined loan balance and supporting documents 730 becomes a subset of electronic personal record 480, which can be stored, for example, in the vault as described above.

In one embodiment, loan officer 772 and title company 774 can move to acquire the loan balance and supporting documents by making a claim to proof of the loan and balance (750) utilizing attribute-based security 740. If the claim is verified, the loan balance and documents can be delivered. That is, use of the claim is the mechanism by which loan officer 772 and title company 774 gain access to the requested information from vault 710.

Figure 9:
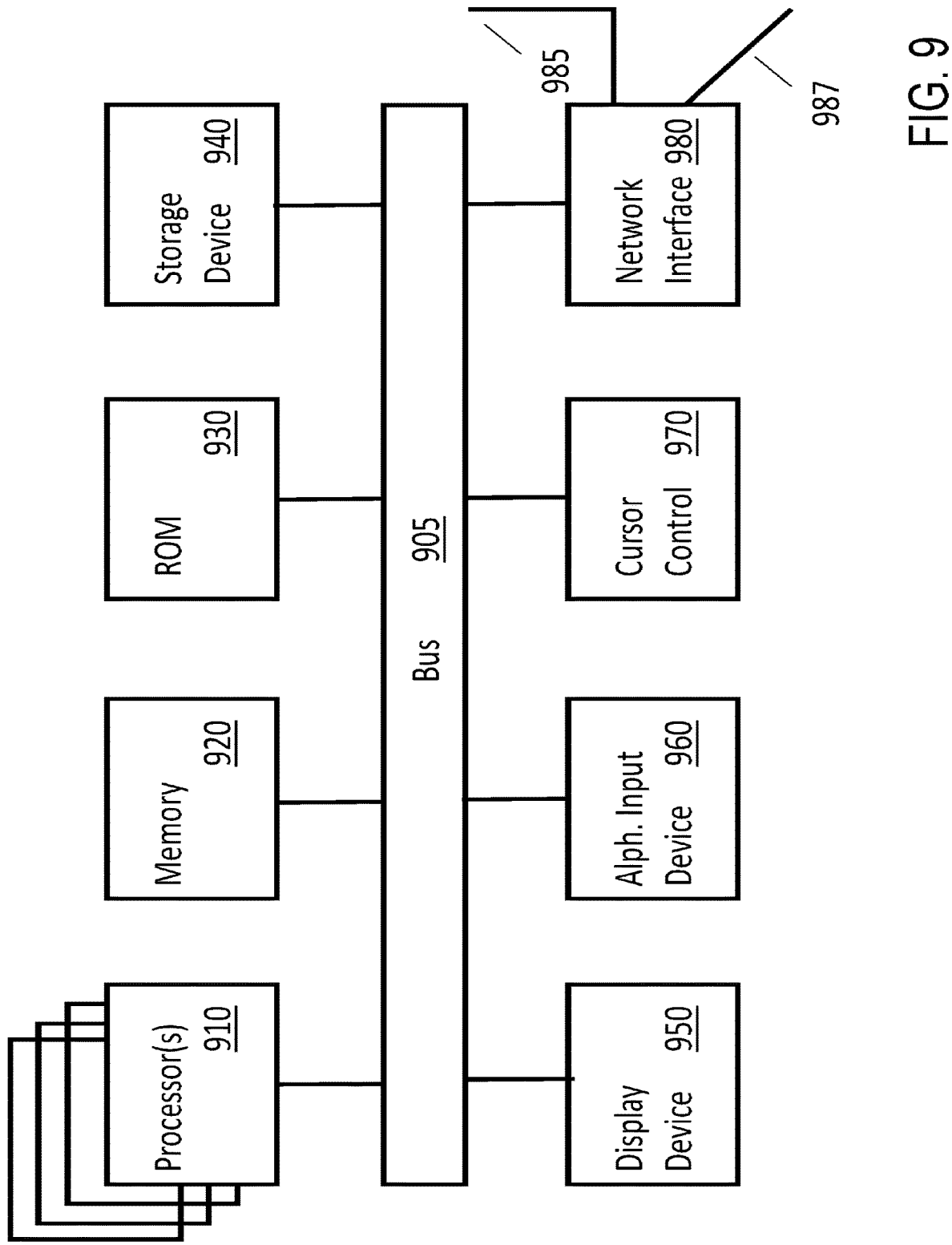
FIG. 9 is a block diagram of one embodiment of an electronic system.

Various functionality described herein can be provided by means of an electronic system. For example, information sharing platform 400 of FIG. 4 can be implemented with one or more electronic systems. Users, vendors, providers and other parties can utilize electronic systems to accomplish their goals. FIG. 9 provides an example electronic system.

Figure 8:
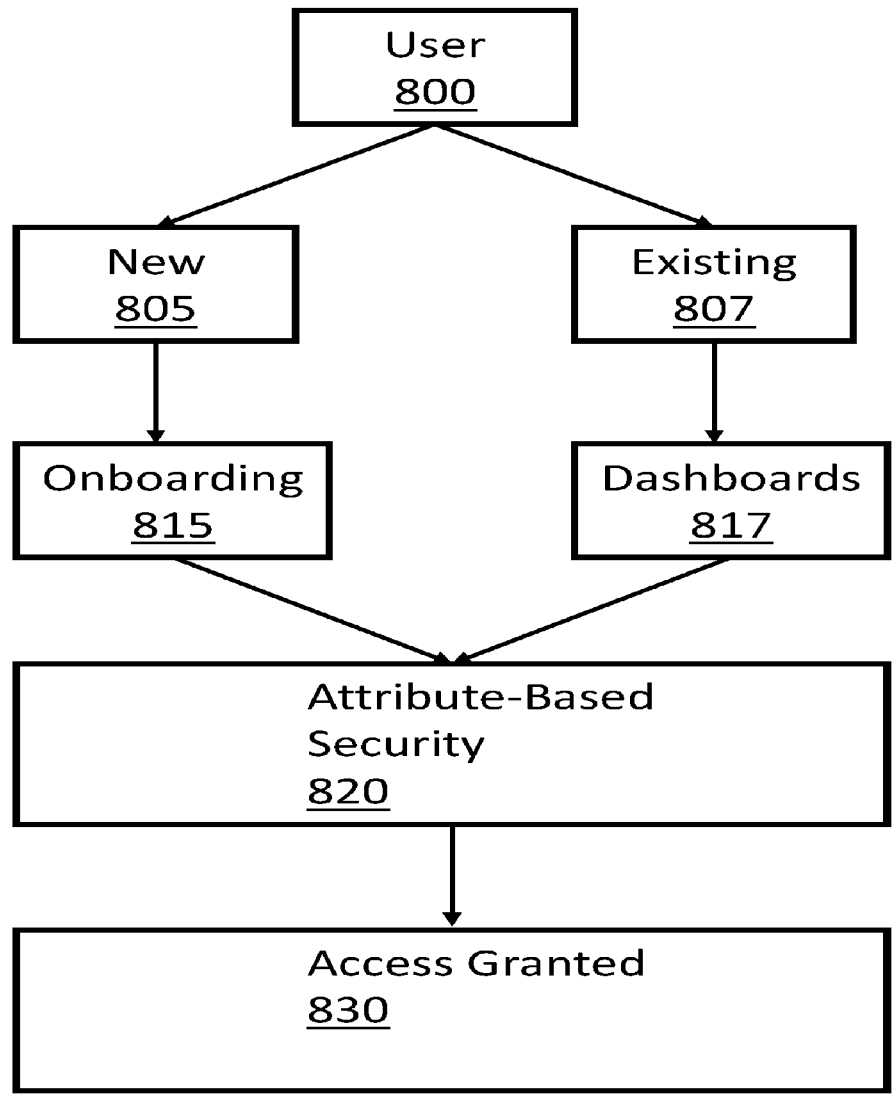
FIG. 8 is a conceptual illustration of one embodiment of an electronic personal record managed using attribute-based security.

FIG. 8 is a conceptual illustration of one embodiment of an electronic personal record managed using attribute-based security. In one embodiment, user 900 can be evaluated and considered either a new user (905) or an existing user (907). This evaluation can be accomplished, for example, via a login page of a graphical user interface (GUI).

In one embodiment, a new user (as determined at 905) can be directed to onboarding process (915), which can include, for example, a tutorial, a video introduction, basic information gathering, selecting settings and preferences, etc. In one embodiment, an existing user (as determined at 907) can be presented with one or more dashboards (917), which can be used to manage personal information as described herein.

In various embodiments, users can use the onboarding process and/or the dashboards to create, modify, manage and/or otherwise work with electronic personal record 930. In one embodiment, electronic personal record 930 can be stored as described above. In various embodiments, electronic personal record 930 can include one or more of documents (e.g., contracts, business documents, estate documents, personal documents), integrations (e.g., banks, brokerages, storage) and/or data/information (e.g., forms, manual input).

In various embodiments, electronic personal record 930 (or portions thereof) can be securely managed and shared utilizing attribute-based security 950. As discussed above, attribute-based security can be administered utilizing at least permission, conditions to be met, roles and/or verification processes. When the relevant security conditions have been met, access can be granted to all or a portion of electronic personal record 930. Access can be grated to providers (e.g., accountants, bankers, financial advisors, attorneys), people with relationships (e.g., spouse, significant other, trustee, employee, partner) and/or connections (e.g., business connections, supply chain). In various embodiments, different levels of access can be granted to different parties on a party-by-party basis.

FIG. 9 is a block diagram of one embodiment of an electronic system. The electronic system illustrated in FIG. 9 is intended to represent a range of electronic systems (either wired or wireless) including, for example, desktop computer systems, laptop computer systems, cellular telephones, smartphones, tablets, wearable computing devices, etc. Alternative electronic systems may include more, fewer and/or different components.

Electronic system 900 includes bus 905 or other communication device to communicate information, and processor 910 coupled to bus 905 that may process information. While electronic system 900 is illustrated with a single processor, electronic system 900 may include multiple processors and/or co-processors. Electronic system 900 further may include random access memory (RAM) or other dynamic storage device 920 (referred to as main memory), coupled to bus 905 and may store information and instructions that may be executed by processor 910. Main memory 920 may also be used to store temporary variables or other intermediate information during execution of instructions by processor 910.

Electronic system 900 may also include read only memory (ROM) and/or other static storage device 930 coupled to bus 905 that may store static information and instructions for processor 910. Data storage device 940 may be coupled to bus 905 to store information and instructions.

Data storage device 940 such as a magnetic disk or optical disc and corresponding drive may be coupled to electronic system 900.

Electronic system 900 may also be coupled via bus 905 to display device 950, such as a cathode ray tube (CRT) or liquid crystal display (LCD), to display information to a user. Alphanumeric input device 960, including alphanumeric and other keys, may be coupled to bus 905 to communicate information and command selections to processor 910. Another type of user input device is cursor control 970, such as a mouse, a trackball, or cursor direction keys to communicate direction information and command selections to processor 910 and to control cursor movement on display 950.

Electronic system 900 further may include network interface(s) 980 to provide access to a network, such as a local area network. Network interface(s) 980 may include, for example, a wireless network interface having antenna 985, which may represent one or more antenna(e). Network interface(s) 980 may also include, for example, a wired network interface to communicate with remote devices via network cable 987, which may be, for example, an Ethernet cable, a coaxial cable, a fiber optic cable, a serial cable, or a parallel cable.

In one embodiment, network interface(s) 980 may provide access to a local area network, for example, by conforming to IEEE 802.11b and/or IEEE 802.11g standards, and/or the wireless network interface may provide access to a personal area network, for example, by conforming to Bluetooth standards. Other wireless network interfaces and/or protocols can also be supported.

IEEE 802.11b corresponds to IEEE Std. 802.11b-1999 entitled "Local and Metropolitan Area Networks, Part 11: Wireless LAN Medium Access Control (MAC) and Physical Layer (PHY) Specifications: Higher-Speed Physical Layer Extension in the 2.4 GHz Band," approved Sep. 16, 1999 as well as related documents. IEEE 802.11g corresponds to IEEE Std. 802.11g-2003 entitled "Local and Metropolitan Area Networks, Part 11: Wireless LAN Medium Access Control (MAC) and Physical Layer (PHY) Specifications, Amendment 4: Further Higher Rate Extension in the 2.4 GHz Band," approved Jun. 27, 2003 as well as related documents. Bluetooth protocols are described in "Specification of the Bluetooth System: Core, Version 1.1," published Feb. 22, 2001 by the Bluetooth Special Interest Group, Inc. Associated as well as previous or subsequent versions of the Bluetooth standard may also be supported.

In addition to, or instead of, communication via wireless LAN standards, network interface(s) 980 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described but can be practiced with modification and alteration within the spirit and scope of the appended claims. The description is thus to be regarded as illustrative instead of limiting.

What is claimed is:

1. A system comprising:
a secure data storage system having one or more data storage devices;
one or more processors coupled with the secure data storage system, the one or more processors configured to provide service provider functionality, wherein the one or more processors are further configured to:
maintain, with the service provider functionality, on the secure data storage system electronic personal records corresponding to one or more respective entities, the electronic personal records having associated role and permission information for respective portions of the electronic personal records, wherein a role is user-defined and used to control sharing of information, and a permission is user-defined to map data categories to be shared, the electronic personal records comprising at least a first portion from a static document owned by and provided by the user, and at least a second portion comprising dynamic information not owned by the user and obtained via an integration with an external data source, the external data source also not owned or controlled by the platform or the user and each portion of the data has one or more corresponding attributes,
receive, from a device external to the system, a request to access a selected portion of a selected electronic personal record, the request comprising at least a claim on data in the selected portion of the selected electronic personal record, wherein the claim corresponds to an entity that are to be granted access to the selected portion of the selected personal record,
evaluate, with the one or more processors, the claim on the data in the selected portion of the selected electronic personal record utilizing attribute-based security and role and permission information for the selected portion of the selected electronic personal record by combining the claim with attributes involving the data where claims indicate entities that are to be granted access corresponding data, wherein attributes refer to characteristics of policies that allow access to the selected portion of the selected personal record and correspond to roles and permissions, and
provide, with the one or more processors, access to the data in the selected portion of the selected electronic personal record in response to an evaluation of the claims and attributes for the data indicating that the request is authorized.

2. The system of claim 1 the one or more processors are further configured to provide a personal data agent that allows one or more corresponding users to manage access to selected electronic personal records by setting role and permission information.

3. The system of claim 1 wherein a designated portion of the electronic personal records maintain smart contract information.

4. The system of claim 3 wherein the one or more processors are further configured to update at least one blockchain in response to updating or executing a smart contract.

5. The system of claim 1 wherein the one or more processors are further configured to:
obtain dynamic information via an integration with an external data source not owned or controlled by an owning entity of a destination electronic personal record, and
update the destination electronic personal record with the dynamic information.

6. The system of claim 1 wherein providing access to the data in the selected portion of the selected electronic personal record in response to a positive evaluation of the claims and attributes for the data comprises returning, to a source of the request, the data in a format specified by the request.

7. The system of claim 1 wherein a first portion of the selected electronic personal record comprises data provided by an owning entity for the selected electronic personal record, and a second portion of the selected electronic personal record comprises data obtained from a third-party source, wherein the data corresponds to the owning entity.

8. A method comprising:
maintaining, on a secure data storage system having at least one storage device and one or more processors coupled with the at least one storage device, electronic personal records corresponding to one or more respective users, the electronic personal records having associated role and permission information for respective portions of the electronic personal records, wherein a role is user-defined and used to control sharing of information, and a permission is user-defined to map data categories to be shared, the electronic personal records comprising at least a first portion from a static document owned by and provided by the user, and at least a second portion comprising dynamic information not owned by the user and obtained via an integration with an external data source, the external data source also not owned or controlled by the platform or the user and each portion of the data has one or more corresponding attributes;
receiving, with the secure data storage system, from a remote electronic device outside the secure data storage system, a request to access a selected portion of a selected electronic personal record, the request comprising at least a claim on data in the selected portion of the selected electronic personal record, wherein the claim corresponds to an entity that are to be granted access to the selected portion of the selected personal record;
evaluating, with the one or more processors, the claim on the data in the selected portion of the selected electronic personal record utilizing attribute-based security and role and permission information for the selected portion of the selected electronic personal record by combining the claim with attributes involving the data where claims indicate entities that are to be granted access corresponding data, wherein attributes refer to characteristics of policies that allow access to the selected portion of the selected personal record and correspond to roles and permissions; and
providing, with the one or more processors, access to the data in the selected portion of the selected electronic personal record in response to an evaluation of the claims and attributes for the data indicating that the request is authorized.

9. The method of claim 8 further comprising providing a personal data agent that allows one or more corresponding users to manage access to selected electronic personal records by setting role and permission information.

10. The method of claim 8 wherein a designated portion of the electronic personal records maintain smart contract information.

11. The method of claim 10 further comprising updating at least one blockchain in response to updating or executing a smart contract.

12. The method of claim 8 further comprising:
obtaining dynamic information via an integration with an external data source not owned or controlled by an owning entity of a destination electronic personal record, and
updating the destination electronic personal record with the dynamic information.

13. The method of claim 8 wherein providing access to the data in the selected portion of the selected electronic personal record in response to a positive evaluation of the claims and attributes for the data comprises returning, to a source of the request, the data in a format specified by the request.

14. The method of claim 8 wherein a first portion of the selected electronic personal record comprises data provided by an owning entity for the selected electronic personal record, and a second portion of the selected electronic personal record comprises data obtained from a third-party source, wherein the data corresponds to the owning entity.

15. A non-transitory computer-readable medium having stored thereon instructions that, when executed by one or more processors, cause the one or more processors to:
maintain on a secure data storage system having at least one storage device and one or more processors coupled with the at least one storage device, electronic personal records corresponding to one or more respective entities, the electronic personal records having associated role and permission information for respective portions of the electronic personal records, wherein a role is user-defined and used to control sharing of information, and a permission is user-defined to map data categories to be shared, the electronic personal records comprising at least a first portion from a static document owned by and provided by the user, and at least a second portion comprising dynamic information not owned by the user and obtained via an integration with an external data source, the external data source also not owned or controlled by the platform or the user and each portion of the data has one or more corresponding attributes,
receive, with the secure data storage system, from a remote electronic device outside the secure data storage system, a request to access a selected portion of a selected electronic personal record, the request comprising at least a claim on data in the selected portion of the selected electronic personal record, wherein the claim corresponds to an entity that are to be granted access to the selected portion of the selected personal record,
evaluate, with the one or more processors, the claim on the data in the selected portion of the selected electronic personal record utilizing attribute-based security and role and permission information for the selected portion of the selected electronic personal record by combining the claim with attributes involving the data where claims indicate entities that are to be granted access corresponding data, wherein attributes refer to characteristics of policies that allow access to the selected portion of the selected personal record and correspond to roles and permissions, and
provide, with the one or more processors, access to the data in the selected portion of the selected electronic personal record in response to an evaluation of the claims and attributes for the data indicating that the request is authorized.

16. The non-transitory computer-readable medium of claim 15 wherein the instructions, when executed, further cause the one or more processors to provide a personal data agent that allows one or more corresponding users to manage access to selected electronic personal records by setting role and permission information.

17. The non-transitory computer-readable medium of claim 15 wherein a designated portion of the electronic personal records maintain smart contract information.

18. The non-transitory computer-readable medium of claim 17 wherein the one or more processors are further configured to update at least one blockchain in response to updating or executing a smart contract.

19. The non-transitory computer-readable medium of claim 15 wherein the one or more processors are further configured to:
obtain dynamic information via an integration with an external data source not owned or controlled by an owning entity of a destination electronic personal record, and
update the destination electronic personal record with the dynamic information.

20. The non-transitory computer-readable medium of claim 15 wherein providing access to the data in the selected portion of the selected electronic personal record in response to a positive evaluation of the claims and attributes for the data comprises returning, to a source of the request, the data in a format specified by the request.

21. The non-transitory computer-readable medium of claim 15 wherein a first portion of the selected electronic personal record comprises data provided by an owning entity for the selected electronic personal record, and a second portion of the selected electronic personal record comprises data obtained from a third-party source, wherein the data corresponds to the owning entity.

* * * * *